(12) United States Patent
Yamada et al.

(10) Patent No.: US 7,808,536 B2
(45) Date of Patent: Oct. 5, 2010

(54) SOLID-STATE IMAGING DEVICE FOR HIGH-SPEED PHOTOGRAPHY

(75) Inventors: Takayoshi Yamada, Osaka (JP);
Takumi Yamaguchi, Kyoto (JP);
Takahiko Murata, Osaka (JP);
Shigetaka Kasuga, Osaka (JP)

(73) Assignee: Panasonic Corporation, Osaka (JP)

( * ) Notice: Subject to any disclaimer, the term of this patent is extended or adjusted under 35 U.S.C. 154(b) by 999 days.

(21) Appl. No.: 11/558,670

(22) Filed: Nov. 10, 2006

(65) Prior Publication Data

US 2007/0109433 A1 May 17, 2007

(30) Foreign Application Priority Data

Nov. 16, 2005 (JP) ............................. 2005-331974
Aug. 7, 2006 (JP) ............................. 2006-214722

(51) Int. Cl.
*H04N 3/14* (2006.01)
*H04N 5/335* (2006.01)
*H04N 5/235* (2006.01)
*H01L 27/00* (2006.01)

(52) U.S. Cl. ................. 348/297; 348/294; 348/295; 348/362; 250/208.1

(58) Field of Classification Search ......... 348/294–297, 348/362–366, 311–315, 319, 320; 250/208.1, 250/214 AL; 257/225, 231
See application file for complete search history.

(56) References Cited

U.S. PATENT DOCUMENTS

RE31,370 E * 9/1983 Mashimo et al. ......... 250/201.8
4,471,228 A * 9/1984 Nishizawa et al. ....... 250/208.1
4,929,824 A * 5/1990 Miyazaki .................... 382/274
6,078,037 A * 6/2000 Booth, Jr. ................ 250/208.1
6,469,289 B1 * 10/2002 Scott-Thomas et al. .. 250/208.1
7,061,524 B2 * 6/2006 Liu et al. .................. 348/208.4
7,176,972 B2 * 2/2007 Mutoh et al. ................. 348/315

FOREIGN PATENT DOCUMENTS

JP 5-137074 6/1993

* cited by examiner

*Primary Examiner*—Tuan Ho
*Assistant Examiner*—Marly Camargo
(74) *Attorney, Agent, or Firm*—Hamre, Schumann, Mueller & Larson, P.C.

(57) ABSTRACT

A solid-state imaging device for high-speed photography includes an imaging element area in which a plurality of pixel portions having photodetectors for photography are disposed in a matrix form. The solid-state imaging device generates image data by capturing pixel information obtained from the photodetectors for photography. The solid-state imaging device for high-speed photography further includes: a change detection element that detects a change in an amount of incident light, which is disposed in the imaging element area or at a predetermined position surrounding the imaging element area; and a controller that controls starting or stopping of capturing of pixel information obtained from the photodetectors for photography in accordance with a trigger signal based on a detection signal output from the change detection element. Since the photographing can be started in accordance with the generation of a phenomenon, the phenomenon can be recorded with reliability, and an excellent power-saving capability also can be provided.

24 Claims, 11 Drawing Sheets

SOLID-STATE IMAGING DEVICE FOR HIGH-SPEED PHOTOGRAPHY

BACKGROUND OF THE INVENTION

1. Field of the Invention

The present invention relates to a solid-state imaging device with a plurality of photodetectors disposed in a matrix form to correspond to pixels. More particularly, the present invention relates to a solid-state imaging device provided with a function suited for the use as a high-speed camera.

2. Description of Related Art

A high-speed camera is used for detailed analysis of the test results for crash tests of vehicles, drop tests of products and the like. In recent years, a high-speed camera especially is used also for analysis of a phenomenon in the physical chemistry field including for the analysis of a combustion state of an internal-combustion engine, the analysis of a chemical reaction and the like. Furthermore, along with the development of a digital image processing system, a digital high-speed camera employing a solid-state imaging element such as a charge coupled device (CCD) or a MOS image sensor has become mainstream.

A digital high-speed camera employing a solid-state imaging element can eliminate the film developing process after photography that used to be required for a film camera, and allows an image to be confirmed just after the photography. Also, it can facilitate capturing an image into digital image analysis equipment using a personal computer or the like.

Since a digital high-speed camera allows an image to be confirmed just after the photography, if there is an error of photographing, the remedy is easy because the photography can be repeated again on the spot. Also in terms of the reuse and processing of data, it is easy to process or alter image data obtained by a digital high-speed camera using a personal computer.

Such a digital high-speed camera, however, has the following disadvantages. That is, there is a limit to the number of shots that a digital high-speed camera can photograph continuously because of restrictions of a writing speed to a recording medium or the like. In order to photograph a moving image continuously, at least one of the frame rate and the image size for photography should be reduced so as to allow the writing to a recording medium to keep up with the photography. On the other hand, when the photography is to be conducted with a high resolution and with a high speed, the number of frames that the camera can photograph is limited and the photographing time will be extremely short because the photography should be conducted with short time intervals. For instance, in the case where the frame rate is 100,000 frames per second and the number of frames that the camera can photograph is 100 frames, the photographing time will be 1 millisecond.

In many cases a phenomenon to be captured by a high-speed camera is generated and finished in a short time, and therefore such short photographing time intervals will suffice. However, the timing should be adjusted so that the phenomenon as a photographing target can be included within such a short photographing time. Since the adjustment of the timing is often difficult, under the current state-of-the-art the adjustment with a smaller range has to be repeated until the trigger of the phenomenon agrees with the timing of the trigger of photographing start so that the photographing target can be included within a photographing time in several milliseconds.

JP H05-137074 A for example proposes a method of photographing while monitoring a change in image. According to this method, pixels of a display as a whole are divided into several sections, and the timing for ending the photography is determined based on an average change in contrast obtained from output signals of these pixels. More specifically, so-called first-in first-out (FIFO) memory is used so that old data is overwritten with new data during continuous photography, and when a change in image is detected after the generation of a phenomenon to be captured, a predetermined number of frames are captured to complete the photography.

According to the method disclosed in JP H05-137074 A, however, the detection is prone to delay because the trigger is determined according to an average contrast change of a display as a whole. Moreover, according to this method, since the photography has to be repeated even before the generation of a phenomenon to be captured, it is difficult to reduce the power consumption of the device.

SUMMARY OF THE INVENTION

Therefore, with the foregoing problems of the related art in mind, it is an object of the present invention to provide a solid-state imaging device for high-speed photography that ensures the recording of a phenomenon by starting the photographing at the timing of the generation of the phenomenon, and has an excellent power-saving capability.

A solid-state imaging device for high-speed photography of the present invention includes an imaging element area in which a plurality of pixel portions having photodetectors for photography are disposed in a matrix form, the solid-state imaging device generating image data by capturing pixel information obtained from the photodetectors for photography. In order to solve the above-mentioned problems, the solid-state imaging device for high-speed photography further includes: a change detection element that detects a change in an amount of incident light, the change detection element being disposed in the imaging element area, at a predetermined position surrounding the imaging element area, or at a position related to the imaging element area while separated therefrom; and a controller that controls starting or stopping of capturing of pixel information obtained from the photodetectors for photography in accordance with a trigger signal based on a detection signal output from the change detection element.

These and other advantages of the present invention will become apparent to those skilled in the art upon reading and understanding the following detailed description with reference to the accompanying figures.

DETAILED DESCRIPTION OF THE INVENTION

According to the solid-state imaging device for high-speed photography of the present invention, a change detection element for detecting a change in an amount of incident light is disposed in an imaging element area, at a predetermined position surrounding the imaging element area, or at a position related to the imaging element area while separated therefrom and photography (capturing image information) is started using a detection signal output from the change detection element as a trigger. Therefore, the photography can be started at the timing of the generation of a phenomenon, so that the phenomenon can be recorded with reliability.

Furthermore, there is no need to start the photographing before the generation of the phenomenon to be captured, and therefore an excellent power-saving capability can be provided.

In the configuration of the solid-state imaging device for high-speed photography of the present invention, a plurality of storage elements may be connected with a plurality of the photodetectors for photography, respectively. Pixel information obtained from the photodetectors for photography may be stored successively in the storage elements in accordance with the trigger signal. After a predetermined number of pieces of pixel information are stored, information stored in the storage elements may be output.

A plurality of the change detection elements may be disposed inside a periphery of the imaging element area. Alternatively, a plurality of the change detection elements may be disposed in a cross shape extending from a center portion of the imaging element area to respective sides thereof. Alternatively, a plurality of the change detection elements may be disposed to gather at a center portion of the imaging element area. Alternatively, a plurality of the change detection elements may be dispersed over the whole imaging element area. Alternatively, a plurality of the change detection elements may be disposed outside and along a periphery of the imaging element area. Various modifications to the arrangement of the change detection elements may be possible in addition to the above-stated examples.

Further, the change detection element may include a photodetector for change detection and a signal processor. The signal processor may compare a level of a signal from the photodetector for change detection with a threshold and output a result of the comparison as a detection signal.

Alternatively, the change detection element may include a photodetector for change detection, a storage portion for storing a signal from the photodetector for change detection and a signal processor. The signal processor may compare a level of a previous signal read from the storage portion with a level of a signal newly obtained from the photodetector for change detection and output a result of the comparison as a detection signal.

Alternatively, the change detection element may include a photodetector for change detection, a storage portion for storing a signal from the photodetector for change detection and a signal processor. The signal processor may determine a difference between a level of a previous signal read from the storage portion and a level of a signal newly obtained from the photodetector for change detection, compare the difference with a threshold and output a result of the comparison as a detection signal.

According to the first configuration of the above-stated three modes of the change detection elements, there is no need to provide storage elements, and the configuration of the signal processor can be simplified. Although the second and the third configurations require a storage element, these configurations can handle various changes in image.

Preferably, the intervals of a detection operation by the change detection element are equal to or shorter than time intervals of a capturing operation of pixel information obtained from the photodetectors for photography. Alternatively, it is preferable that the intervals of a detection operation by the change detection element be equal to or shorter than a time period required for storing pixel information obtained from the photodetectors for photography. With these configurations, when photographing a phenomenon whose changing speed can be dealt with sufficiently for photographing, a failure to photograph such a phenomenon due to insufficient capability of detecting a change in image can be avoided.

Preferably, the above-stated solid-state imaging device for high-speed photography of the present invention includes a plurality of the change detection elements, in which the trigger signal is generated in accordance with a logical combination of results of detection by the change detection elements. This configuration ensures that photography can be conducted in synchronization with a change in the photographing target, thus facilitating the capture of the phenomenon with reliability.

In such a case, at least one of the change detection elements may be disposed at each of four sides surrounding the imaging element area in a rectangular shape.

Furthermore, assuming the change detection elements at each side as one group, detection results by the change detection elements may be combined logically. In the case where even only one of the change detection elements in each group detects a change, the group may output a result showing that a change is detected, and in the case where a change is detected in a group at only one side or groups at only two adjacent sides, the trigger signal may be generated.

Alternatively, assuming a plurality of the adjacent change detection elements as one group, detection results by the change detection elements may be combined logically. In the case where even only one of the change detection elements in each group detects a change, the group may output a result showing that a change is detected, and in the case where a change is detected in only one group or only two adjacent groups of the groups, the trigger signal may be generated.

Furthermore, the change detection elements may be disposed in the imaging element area. The change detection elements may be divided into a plurality of groups, and detection results by the change detection elements of each group may be combined logically. In the case where even only one of the change detection elements in each group detects a change, a result showing that a change is detected from the group may be output, and the trigger signal may be generated in accordance with a logical combination of the detection results of the respective groups.

In such a case, the plurality of groups may be formed in accordance with areas where the change detection elements are disposed. Alternatively, the plurality of groups may be formed so that areas where the change detection elements are disposed are substantially uniform.

According to the above-stated arrangement of the change detection elements, when photographing an object entering into an imaging element area or going out of the imaging element area, the photography can be started or stopped automatically in synchronization with the moment of the movement of the object with reliability.

Furthermore, in the above-stated configuration of the solid-state imaging device for high-speed photography of the present invention, the imaging element area and the change detection element may be separated from each other. The solid-state imaging device for high-speed photography further may include an optical system that splits light incident on the imaging element area and lets a part of the split light be incident on the change detection element. With this configuration, there is no need to perform interpolation, which is for avoiding the missing of pixel information at a pixel where a change detection element is disposed.

In such a case, preferably, the optical system is adjusted so that an amount of light incident on the imaging element area is larger than an amount of the light incident on the change detection element. With this configuration, both of the automated photographing function using a trigger signal from the change detection elements and a high quality image photography can be obtained at the same time.

The following describes solid-state imaging devices for high-speed photography according to embodiments of the present invention in details, with reference to the drawings.

Embodiment 1

Figure 1A:
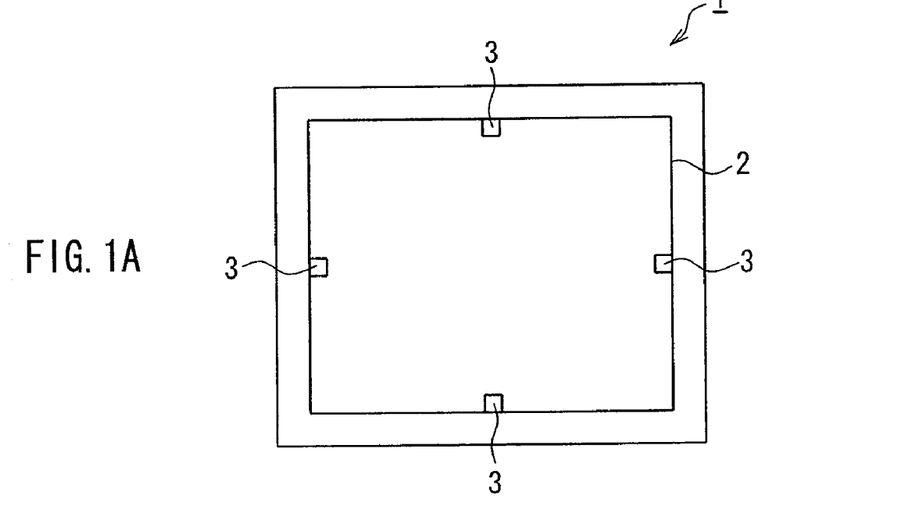
FIG. 1A is a plan view schematically showing the configuration of a solid-state imaging device for high-speed camera according to Embodiment 1 of the present invention.

FIG. 1A is a plan view schematically showing the configuration of a solid-state imaging device 1 for a high-speed camera according to Embodiment 1 of the present invention. The solid-state imaging device 1 includes a plurality of photodetectors for photography disposed in a matrix form to correspond to pixels in a rectangular imaging element area 2. At predetermined positions of the imaging element area 2, four change detection elements 3 are disposed for detecting a change in a target of the photography (image). Herein, the change detection elements 3 may be disposed at predetermined positions of an area surrounding the imaging element area 2. For example, the change detection elements 3 may be formed on the same semiconductor substrate as of the imaging element area 2 and be disposed so as to surround the periphery of the imaging element area 2. Alternatively, the change detection elements 3 may be disposed periodically in the imaging element area with constant intervals. In that case, pixels located at the corresponding positions may be replaced with the change detection elements 3. The change detection elements 3 may be disposed at other arbitrary positions.

The output from the change detection elements 3 is used as a trigger signal for instructing the start of capturing image information (photographing). That is, the photography may be started in accordance with a change in a photographing target as a trigger that is detected by the change detection elements 3, whereby the photography can be started at the timing of the start of a change in the photographing target. After starting the photographing in accordance with the trigger signal, the imaging device 1 photographs images in a number designated beforehand to complete the photography.

Figure 1B:
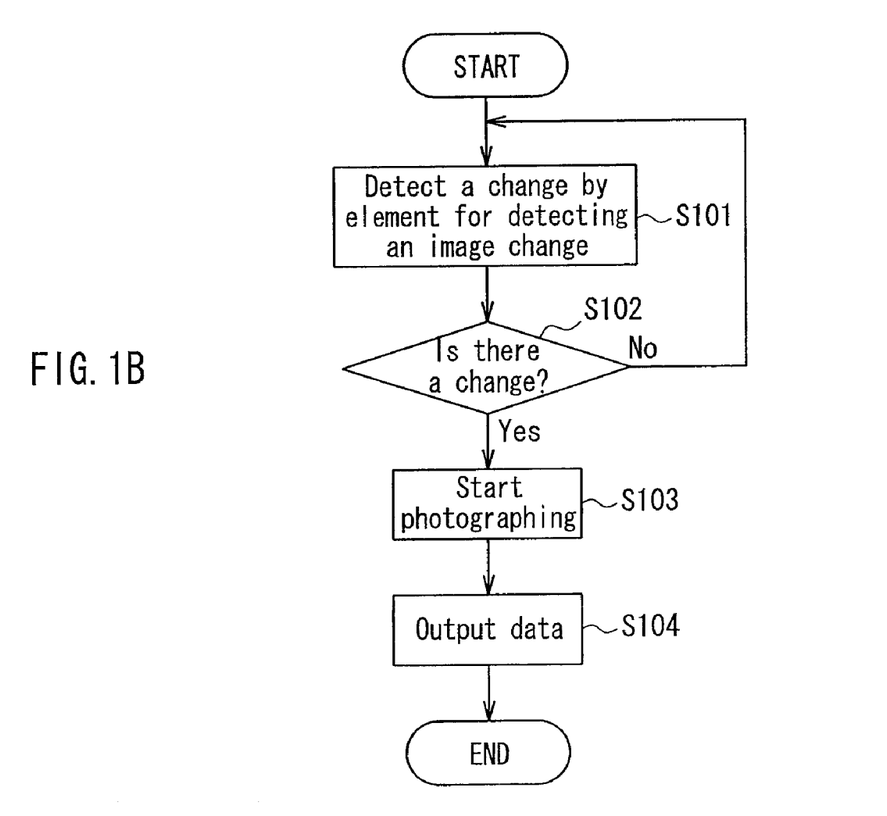
FIG. 1B is a flowchart showing an outline of the procedure by the solid-state imaging device of FIG. 1A.

FIG. 1B is a flowchart showing an outline of the procedure carried out by the solid-state imaging device of FIG. 1A. The change detection elements 3 detect the presence or not of a change in image (step S101). If there is a change in image (step S102, Yes), image information is captured, i.e., photography is started in accordance with a trigger signal that is an output from the change detection elements 3 (step S103). Then, after images in number designated beforehand are captured, data thereof is output (step S104) to complete the photography.

For instance, the change detection elements 3 store immediately previous pixel information (signal level) on the disposed location (pixel), and output a trigger signal when a difference between the previous pixel information (signal level) and new pixel information (signal level) is an arbitrary threshold level or more. This threshold level may be changed depending on a photographing target. In the case where a plurality of change detection elements are provided, a different threshold level may be set for each change detection element.

If all of the four change detection elements 3 detect a change, there is a possibility that the image as a whole moves due to camera shake or the like. Therefore, it is desirable that a trigger signal is not generated in such a case. Thereby, it is possible to respond only to a change in the target.

Furthermore, in order to realize high-speed photography, a desirable configuration is such that a plurality of storage elements (intra-pixel memories) are connected respectively with a plurality of photodetectors for photography provided in the imaging element area 2. In this configuration, pixel information obtained from the photodetectors is transferred successively and stored in the storage elements in accordance with trigger signals, and after a predetermined number of pieces of pixel information are stored, information stored in the respective storage elements is output one by one.

Figure 2:
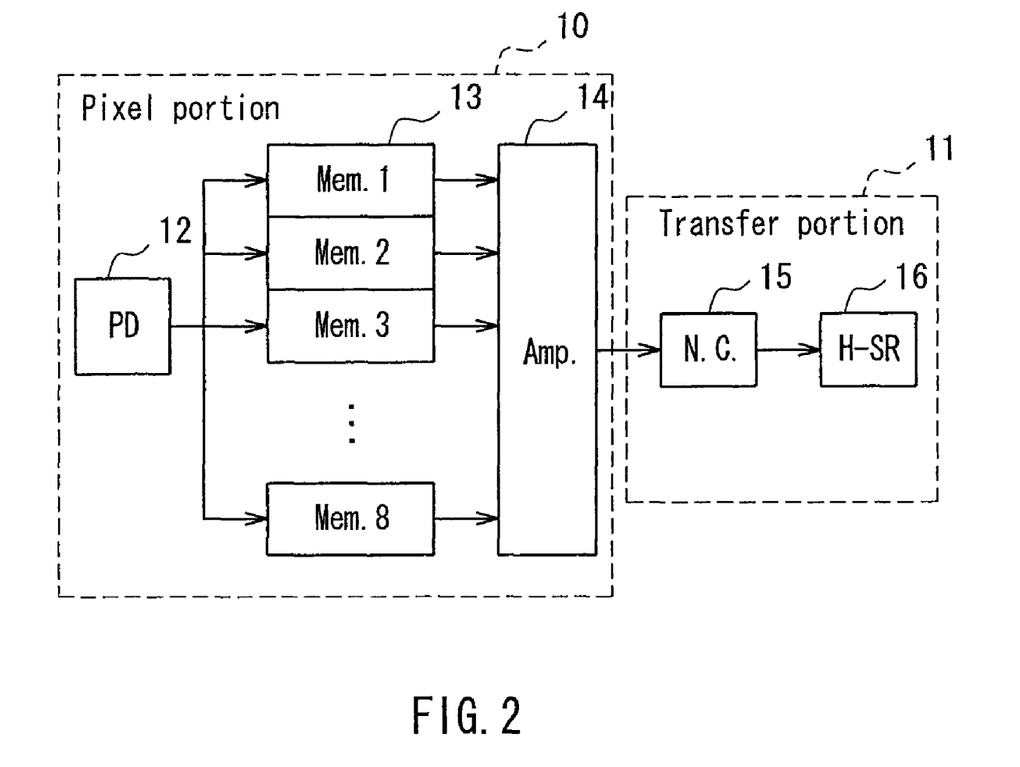
FIG. 2 is a block diagram showing the configuration of a pixel portion in the solid-state imaging device of FIG. 1A.

FIG. 2 is a block diagram showing the configuration of a pixel portion 10 provided with such intra-pixel memories and a signal transfer portion 11. Each pixel portion 10 includes one photodetector (PD) 12 for photography, a plurality of (eight in the illustrated example) intra-pixel memories (Mem. 1 to 8) 13 connected with the PD and an amplifier (Amp.) 14 that amplifies information (signals) read from the respective intra-pixel memories 13. An output signal from the amplifier 14 is fed to the signal transfer portion 11 where a noise component is removed by a noise reduction circuit (N.C.) 15 included in the signal transfer portion 11, and then is transmitted to a horizontal shift register (H-SR) 16.

Figure 3A:
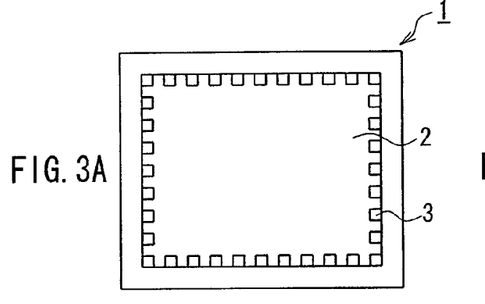
FIG. 3A to FIG. 3G are plan views showing examples of the change detection elements disposed in the solid-state imaging device of FIG. 1A.
Figure 3B:
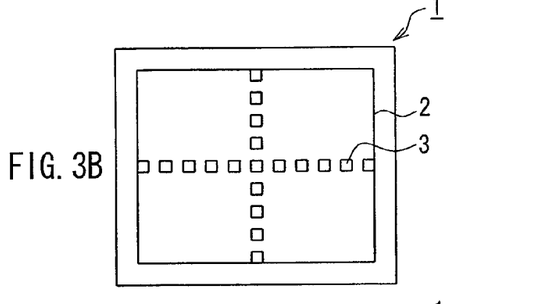
Figure 3C:
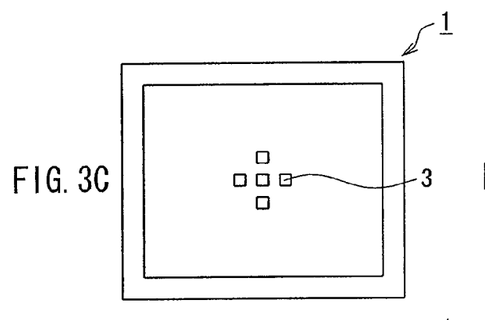
Figure 3D:
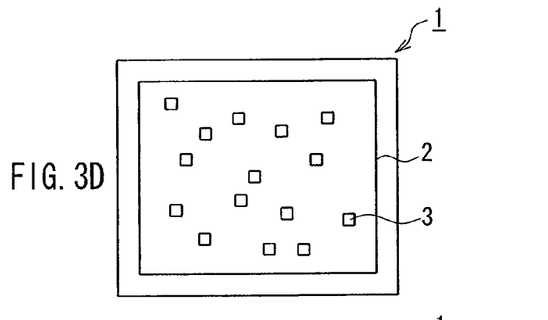
Figure 3E:
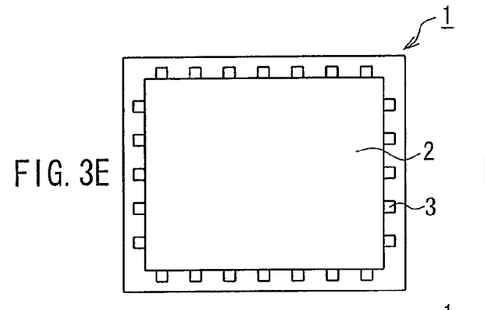
Figure 3F:
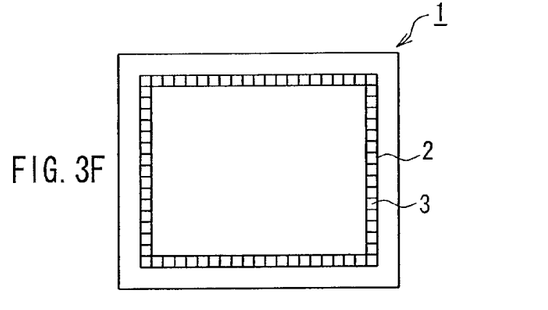
Figure 3G:
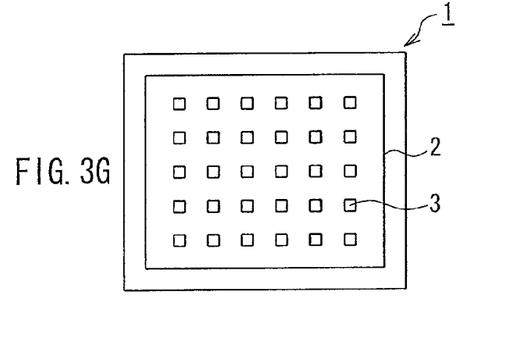

FIG. 3A to FIG. 3G are plan views showing several exemplary arrangements of the change detection elements. In the example of FIG. 3A, a plurality of change detection elements 3 are disposed inside the periphery of the imaging element area 2. In the example of FIG. 3B, a plurality of change detection elements 3 are disposed in a cross shape extending from a center portion of the imaging element area 2 toward the respective sides. In the example of FIG. 3C, a plurality of change detection elements 3 are disposed to gather at a center portion of the imaging element area 2. In the example of FIG. 3D, a plurality of change detection elements 3 are dispersed randomly over the whole imaging element area 2. In the example of FIG. 3E, a plurality of change detection elements 3 are disposed outside and along the periphery of the imaging element area 2. In the example of FIG. 3F, a plurality of change detection elements 3 are disposed continuously inside the periphery of the imaging element area 2. In the example of FIG. 3G, a plurality of change detection elements 3 are dispersed with constant intervals over the whole imaging element area 2.

In this way, various modes can be considered as the arrangement of a plurality of change detection elements 3. Among them, an appropriate arrangement may be selected depending on the intended use of a high-speed camera, that is, how the photographing target will change. The change detection elements 3 may be disposed at the positions on the display where the change of the photographing target is expected, whereby a change of the photographing target can be detected more reliably. For instance, in the case where an object traversing the display is to be captured with a high speed, the change detection elements 3 may be disposed along the periphery of the imaging element area 2 as shown in FIG. 3A, 3E or 3G. Thereby, at the time when the object as the photographing target enters into the display from the outside, the change detection elements 3 can output a trigger signal to start the photographing. In the case where a phenomenon causing a change around a center portion of the display is to be captured with a high speed, the change detection elements 3 may be disposed at a center portion of the imaging element area 2 as shown in FIG. 3B or 3C.

Figure 4:
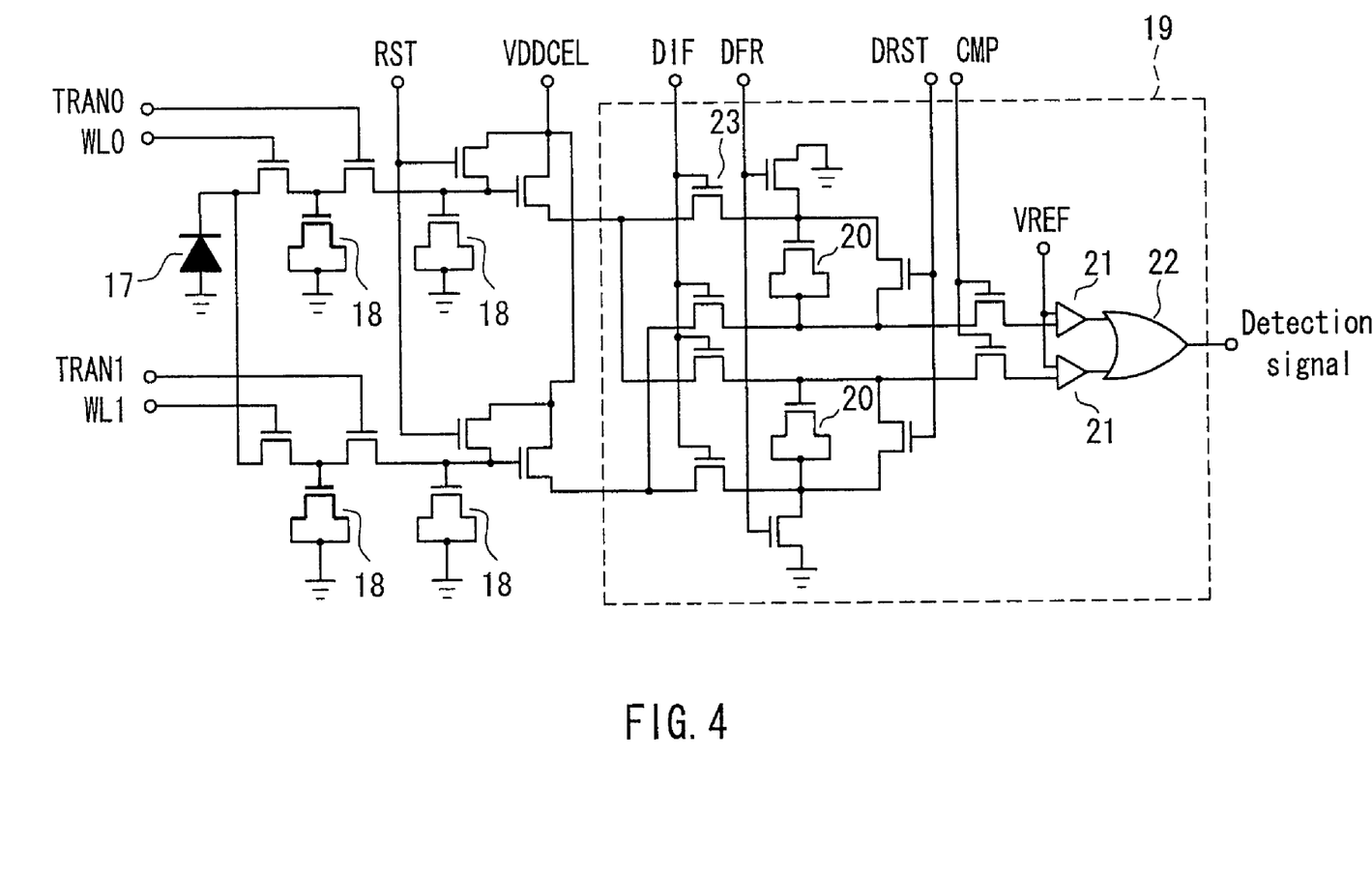
FIG. 4 is a circuit diagram showing an exemplary specific configuration of a change detection element in the solid-state imaging device of FIG. 1A.
Figure 5:
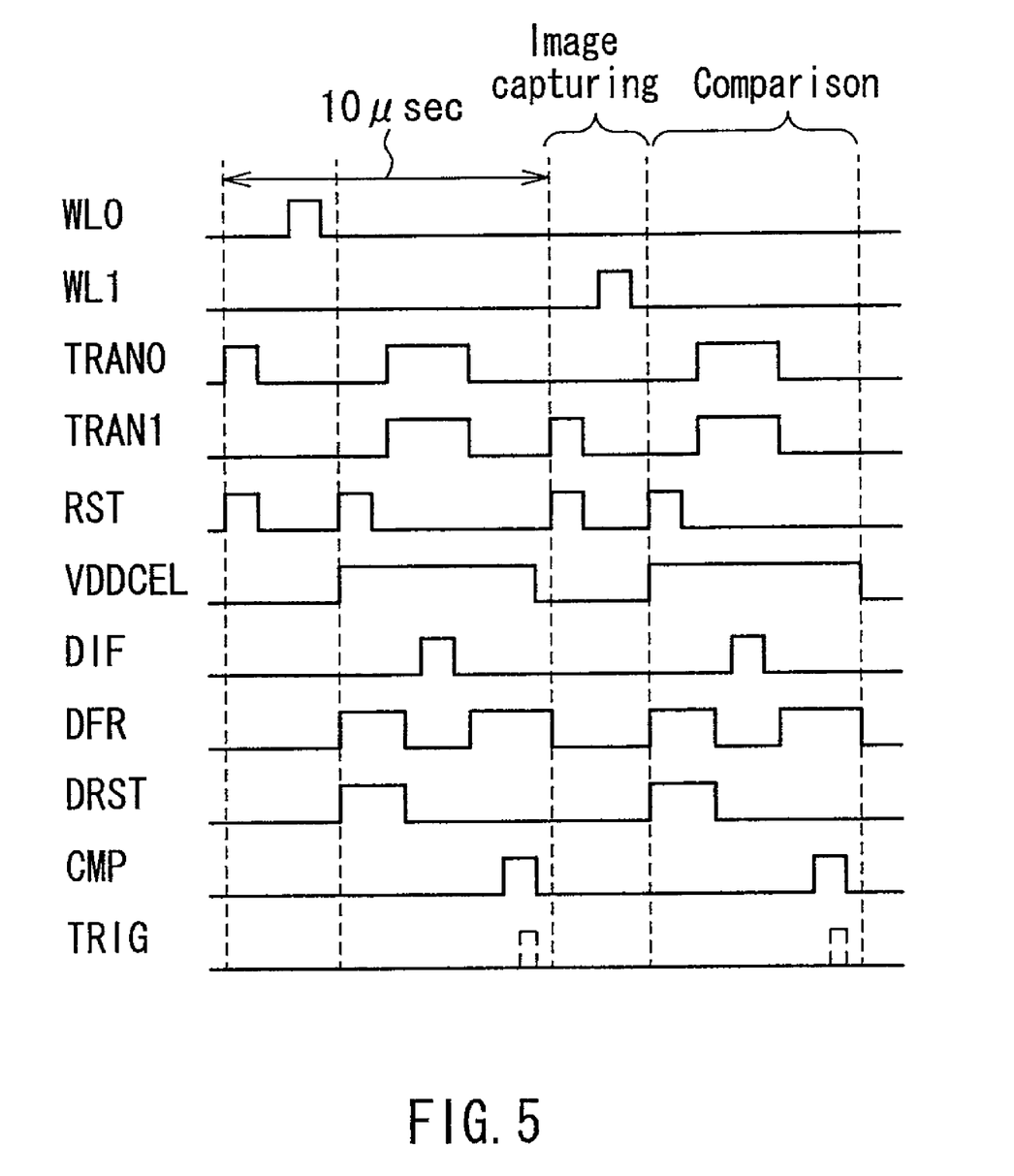
FIG. 5 is a timing chart showing changes in signal levels of the respective parts of FIG. 4.

FIG. 4 is a circuit diagram showing a specific example of the configuration of the change detection element 3. FIG. 5 is a timing chart showing changes in signal levels of the respective parts of FIG. 4. In this example, the change detection element 3 includes a photodetector 17 for detecting a change, a storage portion including a plurality of storage elements 18 for storing signals from the photodetector 17 and a signal processor 19. The signal processor 19 is composed of storage elements 20, comparators 21, an OR circuit 22 and switching elements 23 for switching the feeding of a signal to these elements.

A signal from the photodetector 17 is stored in (updates) alternately an upper storage element 18 and a lower storage element 18 of FIG. 4 under the control of writing control signals WL0 and WL1 that assume an effective level alternately. The signal processor 19 determines a difference between a previous signal level read from one of the storage element 18 (e.g., information stored in the upper storage element 18) and a signal level newly obtained from the photodetector 17 (e.g., information stored in the lower storage element 18), compares the difference with a threshold VREF and outputs the comparison result as a detection signal. More specifically, if the difference between the previous signal level and the new signal level is larger than the threshold VREF, it is regarded that any change is occurring in the photographing target (image), and the detection signal for instructing to start photographing is output.

Referring now to the timing chart of FIG. 5, the operation of the circuit of FIG. 4 will be described below. Firstly, before capturing data, TRAN and RST are turned ON to reset the storage elements 18. Thereafter, as a result of turning TRAN ON an electric charge stored in the photodetector 17 is transferred to a storage element 18. Next, during a comparison sequence, DRST and DFR are turned ON, whereby the signal processor 19 is reset. Thereafter when DIF is turned ON, signals from the storage elements 18 are applied to electrodes of the storage elements 20 of the signal processor 19 alternately. Thereby, a difference obtained by subtracting a signal of the lower storage element 18 from a signal of the upper storage element 18 is stored in the upper storage element 20 of the signal processor 19, whereas a difference obtained by subtracting a signal of the upper storage element 18 from a signal of the lower storage element 18 is stored in the lower storage element 20 of the signal processor 19. Thereafter, CMP is turned ON, so that comparison is made with the threshold VREF by a comparator 21. Thereby, a difference between an old signal and a new signal is created, which is output through the OR circuit 22.

The function of such change detection elements 3 may be limited so that a change in only one direction between from black to white or from white to black can be detected. For instance, in the case where a whitish object flying in a dark background is to be captured, such a simplified change detection element 3 is suitable. The change detection elements 3 further may be simplified so that, instead of detecting a change in color or brightness, a trigger signal is output when the present brightness exceeds a threshold. This can be implemented easily by using a threshold level of an inverter circuit.

In this way, it is preferable that the change detection elements 3 (signal processor 19) be designed appropriately depending on the details of a change of the photographing target. In the case where a change in brightness of the photographing target is detected as a trigger, a threshold level for judgment may be set higher when the change in brightness of the photographing target is relatively large, whereas the threshold level may be set lower when the change in brightness of the photographing target is relatively small. In this way, it is desirable that the threshold level be adjustable in such a case.

Furthermore, detection operation intervals that are time intervals at which the change detection elements 3 detect a change in the image preferably are equal to or shorter than time intervals at which pixel information obtained from the photodetector (PD) 12 for photography is captured. Shorter time intervals can reduce a failure in photographing (missing) at the time when a change in the image starts. However, in some applications, the detection operation intervals can be set longer so as to suppress the power consumption.

Figure 6A:
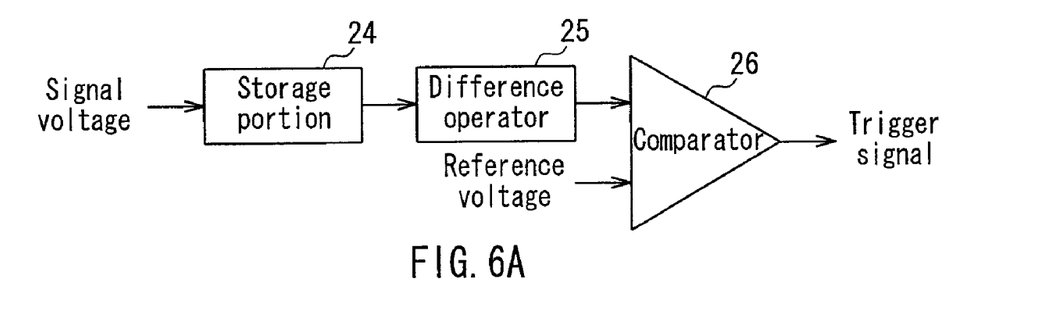
FIGS. 6A to 6D are block diagrams showing exemplary configurations of a processor of a change detection element.

FIGS. 6A to 6D are block diagrams showing several exemplary configurations of a processor of a change detection element. FIG. 6A corresponds to the configuration of the present embodiment shown in FIG. 4 and FIG. 5. In this example, a signal voltage from the photodetector 17 for detecting a change is stored in a storage portion 24 (storage element 18), a difference between a previous signal voltage and a new signal voltage is determined by a difference operator 25 and the difference is compared with a reference voltage (threshold) by the comparator 26. An output from the comparator 26 serves as a trigger signal.

Figure 6B:
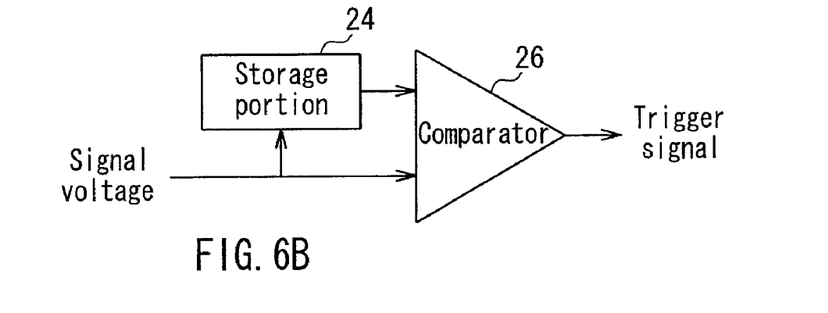

In the configuration of FIG. 6B, a signal from the photodetector 17 for detecting a change is stored in a storage portion 24, and a previous signal voltage read from the storage portion 24 and a new signal voltage from the photodetector 17 for detecting a change are compared by a comparator 26. The comparison result is output as a trigger signal.

Figure 6C:
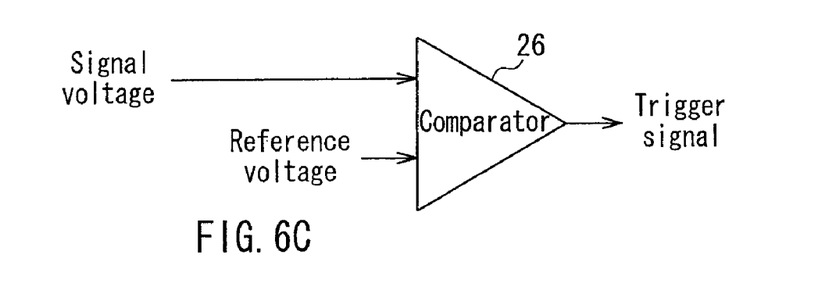

In the configuration of FIG. 6C, the circuit is simplified so that a signal voltage from the photodetector 17 for detecting a change is compared with a reference voltage (threshold) by a comparator 26 and the comparison result serves as a trigger signal.

Figure 6D:
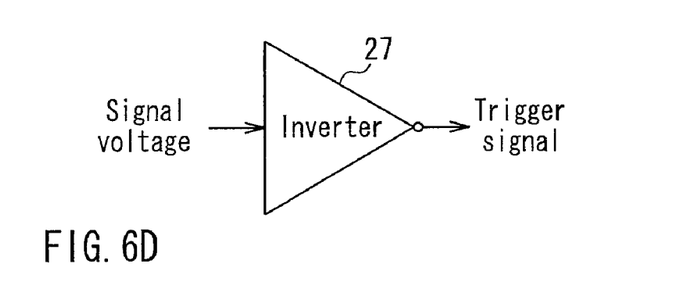

In the configuration of FIG. 6D, the circuit further is simplified, where an inverter circuit 27 is used instead of the comparator of FIG. 6C and a threshold level of the inverter circuit is used instead of the reference voltage. That is, when the signal voltage from the photodetector 17 for detecting a change is higher than the threshold level of the inverter circuit 27, the output is reversed.

Figure 7:
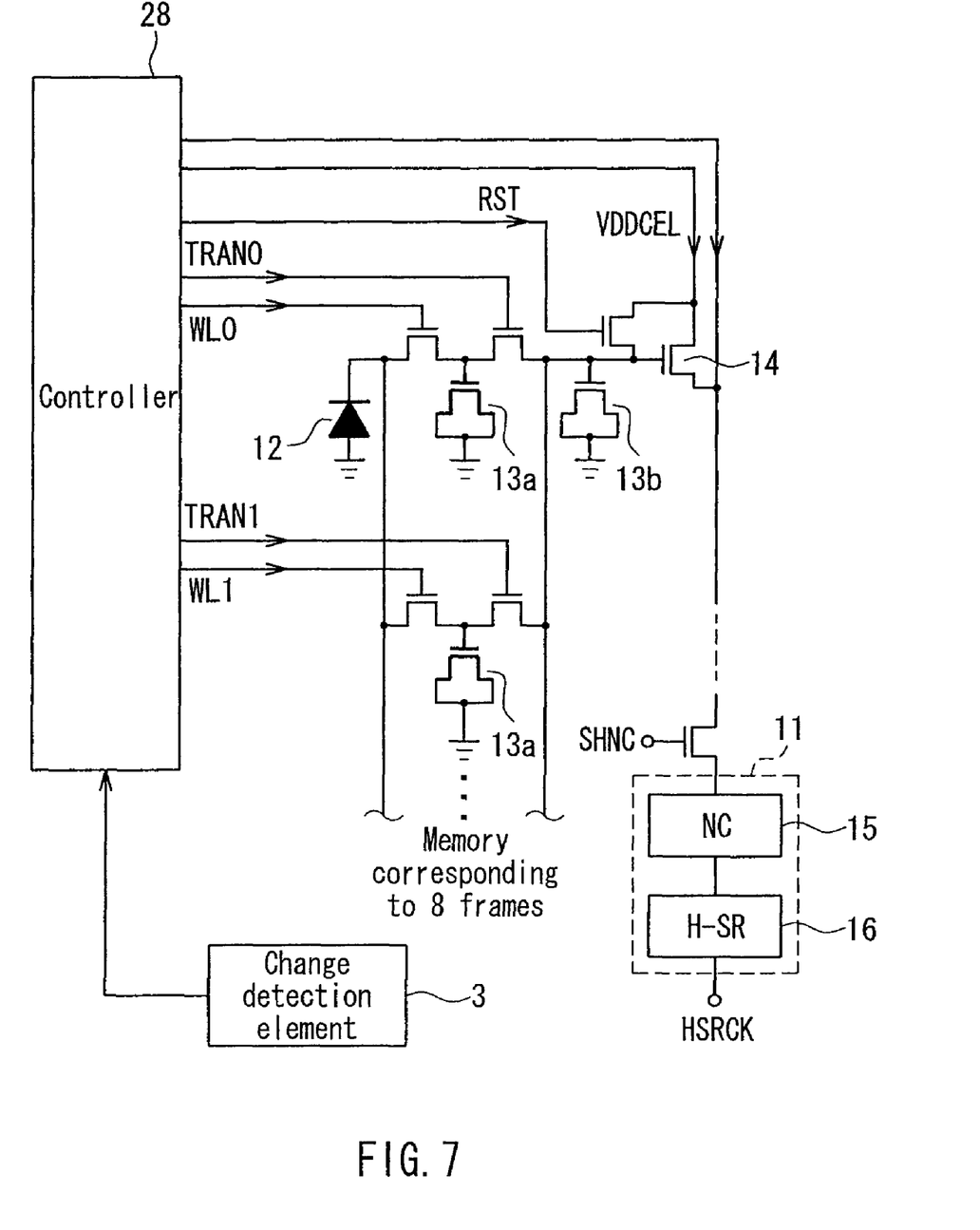
FIG. 7 is a circuit diagram showing an exemplary specific configuration of the pixel portion shown in FIG. 2.
Figure 8:
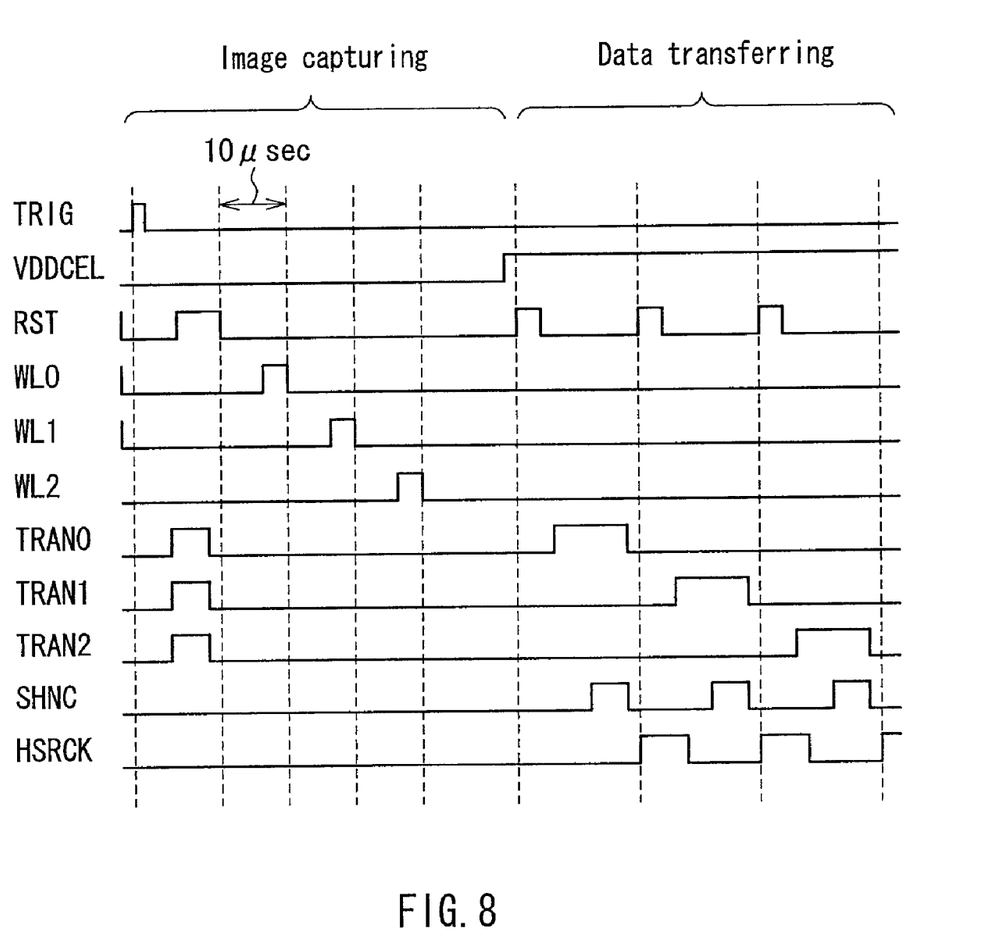
FIG. 8 is a timing chart of an exemplary operation of the pixel portion.

FIG. 7 is a circuit diagram showing an exemplary specific configuration of the pixel portion 10 shown in the block diagram of FIG. 2. FIG. 8 is a timing chart of an operation example of the pixel portion having the configuration of FIG. 7. Note here that FIG. 7 shows only one pixel portion and one change detection element 3 for convenience.

In this example, eight intra-pixel memories 13a (corresponding to eight frames) composed of MOS capacitors are connected with the photodetector 12 for photography. Pixel information corresponding to eight frames is stored in time sequence so that signal voltages from the photodetector 12 for photography are stored in the eight intra-pixel memories 13a one by one. The writing to the intra-pixel memories 13a, 13b (capturing of pixel information) is controlled by signals TRAN0, TRAN1, WL0, WL1, RST, VDDCEL, SHNC and the like that are supplied from a controller 28. The controller 28 generates a trigger signal in accordance with a detection signal supplied from the change detection elements 3 and controls the starting and stopping of the writing to the intra-pixel memories 13a, 13b.

The intra-pixel memories 13a, 13b are not limited to MOS capacitors that utilize a gate capacity of a transistor, and may be composed of capacitors utilizing a diffusion region and a nonvolatile memory made of a ferroelectric material or the like. The capacitors making up the intra-pixel memories 13a, 13b may be connected with the photodetector 12 for photography via transistor switches as shown in FIG. 7, or may be connected with an output of an amplifier that amplifies a signal from the photodetector 12 for photography via a transistor switch.

It is desirable that writing to the respective intra-pixel memories 13a be conducted simultaneously for all of the pixels. When capturing of pixel information is started in accordance with a trigger signal, the pixel information is stored one by one in the intra-pixel memories 13a. When the storage in the intra-pixel memories 13a corresponding to 8 frames is completed, the photographing is stopped, and the information stored in the intra-pixel memories 13a is output via the signal transfer portion 11. When the output of all of the information is completed, the device assumes the original photographing standby status, and remains in the standby status until a trigger signal is received again. This operation is repeated, whereby high-speed photography can be repeated.

The operation of the pixel portion of FIG. 7 will be described below, with reference to the timing chart of FIG. 8. When receiving a detection signal from the change detection elements 3, the controller 28 generates a trigger signal to start the capturing of an image. Then, RST and all TRANs are turned ON to reset the intra-pixel memories 13a, 13b. Next, WL0 to WLn are turned ON one by one, whereby an electric charge stored in the photodetector 12 for photography is saved in the intra-pixel memories 13a successively. Next, during a reading operation, RST is turned ON to reset the amplifier 14, and thereafter TRAN0 is turned ON. Then, the signal recorded in an intra-pixel memory 13b is amplified by the amplifier 14, which then is transferred to the noise canceller 15 and the shift register 16. This operation is conducted for TRAN1 through TRANn successively, whereby all information can be captured.

As stated above, according to the imaging device of the present embodiment using automated trigger, a trigger can be set at a point where a change is likely to occur depending on a phenomenon, whereby a trigger element can react in synchronization with the generation of the phenomenon so as to start the photographing. For instance, when a phenomenon that is difficult to anticipate is to be captured, e.g., the collision state of an object traveling at high speed and a moment when a phenomenon such as a chemical reaction occurs, it is extremely difficult to photograph the moment of such a phenomenon. According to the imaging device of the present embodiment, however, the photographing can be started at the timing of the generation of a phenomenon, so that the phenomenon can be recorded with reliability.

Furthermore, even when there is a limit to a continuous photographing frame number, the moment of the phenomenon can be captured with reliability, so that such a limit on the continuous photographing frame number can be alleviated.

Embodiment 2

Figure 9:
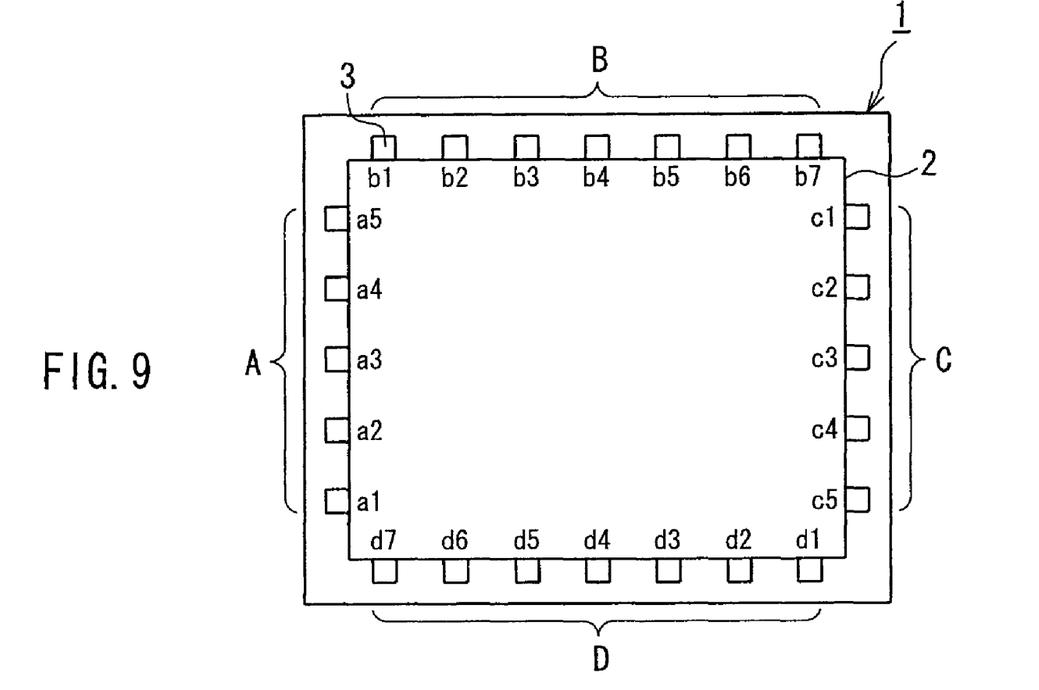
FIG. 9 is a plan view showing an example where change detection elements are disposed in a solid-state imaging device for high-speed camera according to Embodiment 2 of the present invention.
Figure 10:
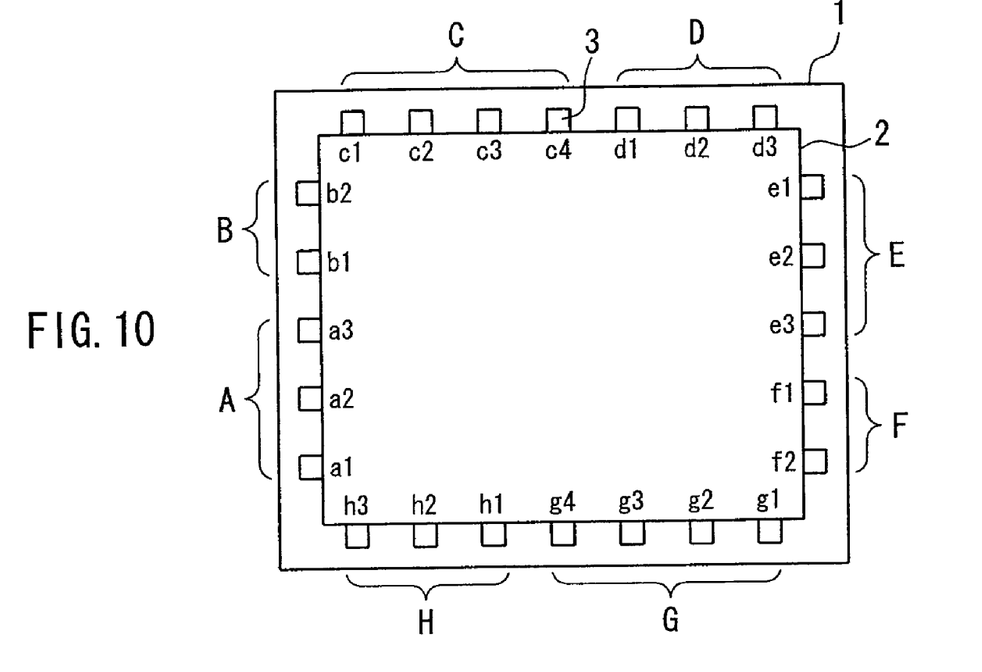
FIG. 10 is a plan view showing another example where change detection elements are disposed in the solid-state imaging device for high-speed camera.
Figure 11:
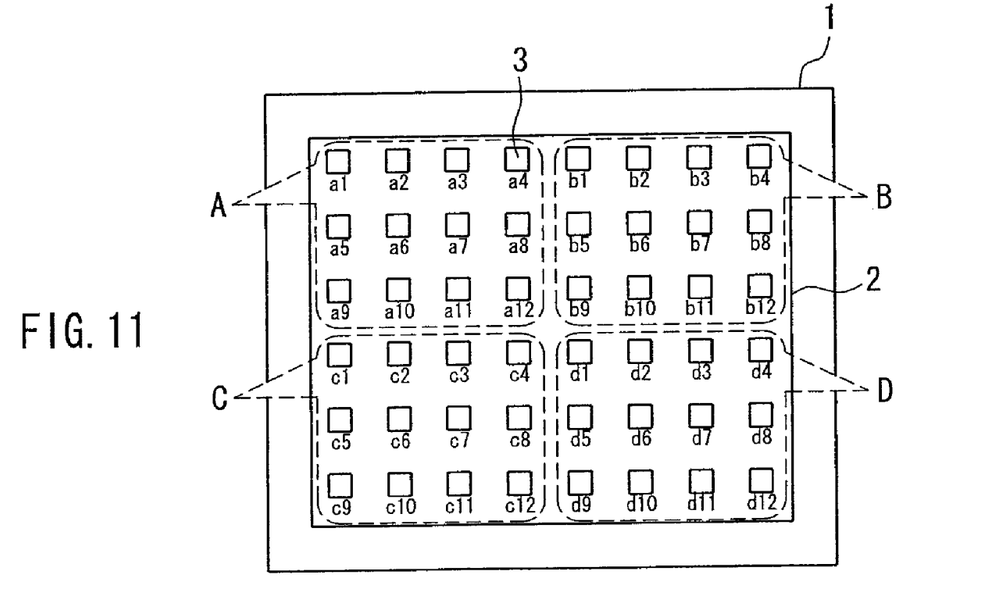
FIG. 11 is a plan view showing still another example where change detection elements are disposed in the solid-state imaging device for high-speed camera.

Referring now to FIGS. 9 to 11, a solid-state imaging device for high-speed camera according to Embodiment 2 of the present invention will be described below. The basic configuration of the solid-state imaging device of the present embodiment is similar to that of Embodiment 1, but the present embodiment has an improved configuration, i.e., information from change detection elements is analyzed, and when detection signals in a specific combination are obtained, the starting or stopping of the photographing is controlled. The explanation of such improvement follows.

When the change detection elements are provided to detect a change in image and the photographing simply is started or stopped automatically in accordance with the detection signal as a trigger as in Embodiment 1, there is a possibility that a malfunction occurs due to camera shake, a change in ambient lighting of a photographing target or the like. Since the change detection elements detect even such a phenomenon as a change in image, the photographing will be started at a timing different from that of a phenomenon to be actually captured. Therefore, it is desirable that the solid-state imaging device have a function to differentiate between a change in the whole image and a change in the target only and to generate a signal for starting or stopping the photographing when the target only is changed. The solid-state imaging device of the present embodiment has such a function.

FIG. 9 shows an example where change detection elements 3 are disposed at the periphery of the pixel portion. The results of the detection by a plurality of change detection elements 3 that are disposed along and outside the periphery of an imaging element area 2 are shown by a1 to a5, b1 to b7, c1 to c5 and d1 to d7, respectively. In this example, the change detection elements 3 at the respective sides are divided into groups A to D, respectively. That is, the change detection elements a1 to a5 belong to group A, the change detection elements b1 to b7 belong to group B, the change detection elements c1 to c5 belong to group C and the change detection elements d1 to d7 belong to group D. In the following, a logical combination of the detection results of the respective groups is represented using A to D.

An integrated detection result concerning all of the change detection elements 3 is represented by a logical combination of the change detection elements 3. Firstly, in the case where even one of the change detection elements in each group detects a change in the image, it is regarded that the corresponding group detects a change. Then, the detection results A to D of the change detection elements 3 for the respective groups can be represented as follows:

$A = a1 + a2 + a3 + a4 + a5$ $B = b1 + b2 + b3 + b4 + b5 + b6 + b7$ $C = c1 + c2 + c3 + c4 + c5$ $D = d1 + d2 + d3 + d4 + d5 + d6 + d7$.

Furthermore, in the case where only one of these groups detects a change, it is regarded that a change occurs in the target, and a trigger signal is generated. Then, TRIG that is an integrated detection result of all of the change detection results 3 is represented by the following formula (1):

$$TRIG = A \cdot \overline{B} \cdot \overline{C} \cdot \overline{D} + \overline{A} \cdot B \cdot \overline{C} \cdot \overline{D} + \overline{A} \cdot \overline{B} \cdot C \cdot \overline{D} + \overline{A} \cdot \overline{B} \cdot \overline{C} \cdot D. \quad (1)$$

If the target enters from the upper left corner in a slanting direction, group A and group B will detect the change. Considering such a case, another possible configuration is such that when only one of these groups or only two adjacent groups detect a change, a trigger signal may be generated. In this case, TRIG is represented by the following formula (2):

$$TRIG = A \cdot \overline{B} \cdot \overline{C} \cdot \overline{D} + \overline{A} \cdot B \cdot \overline{C} \cdot \overline{D} + \overline{A} \cdot \overline{B} \cdot C \cdot \overline{D} + \overline{A} \cdot \overline{B} \cdot \overline{C} \cdot D + \\ A \cdot B \cdot \overline{C} \cdot \overline{D} + \overline{A} \cdot B \cdot C \cdot \overline{D} + \overline{A} \cdot \overline{B} \cdot C \cdot D + A \cdot \overline{B} \cdot \overline{C} \cdot D. \quad (2)$$

FIG. 10 shows an example where change detection elements are disposed in a similar manner to FIG. 9 but the grouping thereof is in a different manner. The change detection elements 3 are divided into groups A to H. In this example, since the change detection elements 3 are divided into smaller groups than in FIG. 9, the detection accuracy can be enhanced.

FIG. 11 shows an example where change detection elements 3 are disposed inside the imaging element area 2. Change detection elements a1 to a12 as group A, change detection elements b1 to b12 as group B, change detection elements c1 to c12 as group C and change detection elements d1 to d12 as group D are provided. The change detection elements 3 are divided into groups for the respective areas, whereby in this configuration also a change in the whole image and a change in a larger area can be ignored, so that it becomes possible to respond to a change in the target only.

Embodiment 3

Figure 12:
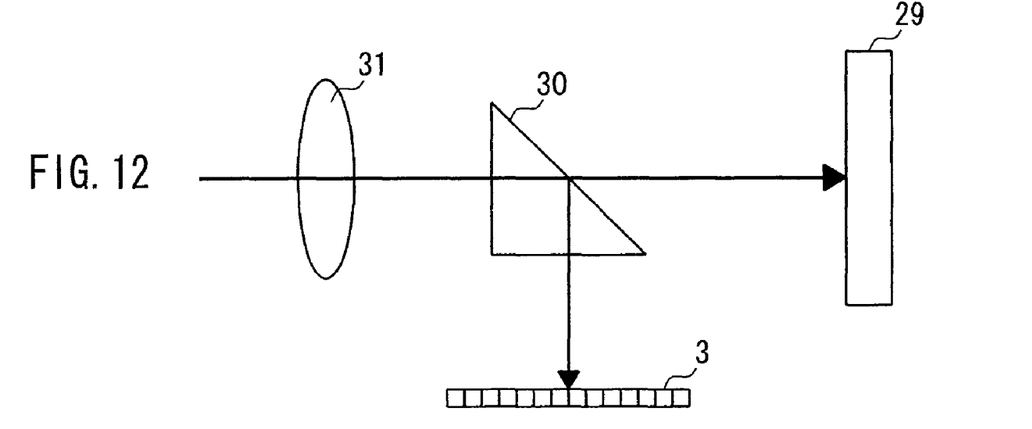
FIG. 12 schematically shows a configuration of a solid-state imaging device for high-speed camera according to Embodiment 3 of the present invention.
Figure 13:
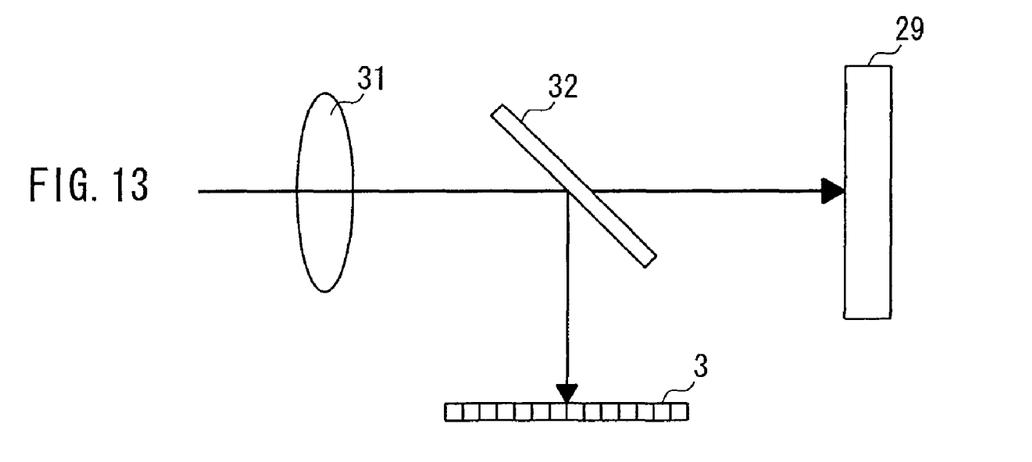
FIG. 13 schematically shows another exemplary configuration of the solid-state imaging device according to Embodiment 3 of the present invention.

Referring now to FIGS. 12 and 13, a solid-state imaging device for high-speed camera according to Embodiment 3 of the present invention will be described below. In the present embodiment, an imaging element area (solid-state imaging element) and a change detection element are provided separately. An optical system is provided for splitting light incident on the imaging element area and letting a part of the split light be incident on the change detection element.

FIG. 12 shows the state where light incident on a solid-state imaging element 29 is split by a prism 30. Light passing through a lens 31 is split into light that travels in a straight line through the prism 30 and is incident on the solid-state imaging element 29 having an imaging element area and light that is bent by the prism 30 and is incident on a change detection element 3.

In this way, the light incident on pixels is split into the light incident on the solid-state imaging element 29 and the light incident on the change detection element 3, whereby pixel information of the image to be captured can be obtained also for a pixel where the change detection element 3 is to be provided. Therefore, deterioration of the quality of the captured image can be avoided. In other words, an image can be captured using photodetectors for all pixels disposed over the imaging element area, so that a high quality image can be obtained. At this time, the reflectivity of the prism 30 may be adjusted so that the amount of light incident on the solid-state imaging element 29 is more than the amount of light incident on the change detection element 3. In this way, both of the automated photographing function using a trigger signal as a feature of the present invention and a high quality image photography can be obtained at the same time.

FIG. 13 shows a modified example of the configuration of FIG. 12 where a half mirror 32 is used instead of the prism 30. With this configuration also, the effects similar to the configuration of FIG. 12 can be obtained. The reflectivity of the half mirror 32 may be adjusted so that the amount of light incident on the solid-state imaging element 29 is more than the amount of light incident on the change detection element 3.

Instead of splitting incident light into light incident on the solid-state imaging element 29 and light incident on the change detection element 3 as in the above-stated embodiments, still another configuration is possible to make light incident only on the change detection element 3. In such a case, in order for the image not to lose pixel information concerning a pixel where the change detection element 3 exists, interpolation preferably is executed by determining as information for such a pixel an average of the pixel information surrounding the pixel.

The invention is not limited to the above-stated embodiments and modified examples and may be embodied in other forms. For instance, the above embodiments show the exemplary circuit where the solid-state imaging devices employ MOS transistors for selecting images. However, the present invention is applicable to a CCD-type solid-state imaging element as well. Although embodiments of the present invention have been described with reference to several exemplary drawings, the number and the arrangement of the photodetectors for photography, the photodetectors for detecting a change and the storage elements are not limited to the illustrated examples and can be modified appropriately.

What is claimed is:

1. A solid-state imaging device for high-speed photography, comprising an imaging element area in which a plurality of pixel portions having photodetectors for photography are disposed in a matrix form, the solid-state imaging device generating image data by capturing pixel information obtained from the photodetectors for photography,
    wherein the solid-state imaging device further comprises:
    a change detection element that detects a change in an amount of incident light, the change detection element being disposed in the imaging element area, at a predetermined position surrounding the imaging element area, or at a position related to the imaging element area while separated therefrom; and
    a controller that controls starting or stopping of capturing of pixel information obtained from the photodetectors for photography in accordance with a trigger signal based on a detection signal output from the change detection element, and
    wherein the change detection element comprises a photodetector for change detection, a storage portion for storing a signal from the photodetector for change detection and a signal processor, and
    the signal processor determines a difference between a level of a previous signal read from the storage portion and a level of a signal newly obtained from the photodetector for change detection, compares the difference with a threshold and outputs a result of the comparison as a detection signal.

2. The solid-state imaging device for high-speed photography according to claim 1,
    wherein a plurality of storage elements are connected with a plurality of the photodetectors for photography, respectively,
    pixel information obtained from the photodetectors for photography is stored successively in the storage elements in accordance with the trigger signal, and after a predetermined number of pieces of pixel information are stored, information stored in the storage elements is output.

3. The solid-state imaging device for high-speed photography according to claim 2, wherein intervals of a detection operation by the change detection element are equal to or shorter than a time period required for storing pixel information obtained from the photodetectors for photography.

4. The solid-state imaging device for high-speed photography according to claim 1, wherein a plurality of the change detection elements are disposed inside a periphery of the imaging element area.

5. The solid-state imaging device for high-speed photography according to claim 1, wherein a plurality of the change detection elements are disposed in a cross shape extending from a center portion of the imaging element area to respective sides thereof.

6. The solid-state imaging device for high-speed photography according to claim 1, wherein a plurality of the change detection elements are disposed to gather at a center portion of the imaging element area.

7. The solid-state imaging device for high-speed photography according to claim 1, wherein a plurality of the change detection elements are dispersed over the whole imaging element area.

8. The solid-state imaging device for high-speed photography according to claim 1, wherein intervals of a detection operation by the change detection element are equal to or shorter than time intervals of a capturing operation of pixel information obtained from the photodetectors for photography.

9. The solid-state imaging device for high-speed photography according to claim 1, comprising a plurality of the change detection elements, wherein the trigger signal is generated in accordance with a logical combination of results of detection by the change detection elements.

10. The solid-state imaging device for high-speed photography according to claim 9, wherein at least one of the change detection elements is disposed at each of four sides surrounding the imaging element area in a rectangular shape.

11. The solid-state imaging device for high-speed photography according to claim 10,
wherein assuming the change detection elements at each side as one group, detection results by the change detection elements are combined logically,
wherein in the case where even only one of the change detection elements in each group detects a change, the group outputs a result showing that a change is detected, and
in the case where a change is detected in a group at only one side or groups at only two adjacent sides, the trigger signal is generated.

12. The solid-state imaging device for high-speed photography according to claim 10,
wherein assuming a plurality of the adjacent change detection elements as one group, detection results by the change detection elements are combined logically,
wherein in the case where even only one of the change detection elements in each group detects a change, the group outputs a result showing that a change is detected, and
in the case where a change is detected in only one group or only two adjacent groups of the groups, the trigger signal is generated.

13. The solid-state imaging device for high-speed photography according to claim 9,
wherein the change detection elements are disposed in the imaging element area,
the change detection elements are divided into a plurality of groups, and detection results by the change detection elements of each group are combined logically,
in the case where even only one of the change detection elements in each group detects a change, the group outputs a result showing that a change is detected, and
the trigger signal is generated in accordance with a logical combination of the detection results of the respective groups.

14. The solid-state imaging device for high-speed photography according to claim 13, wherein the plurality of groups are formed in accordance with areas where the change detection elements are disposed.

15. The solid-state imaging device for high-speed photography according to claim 13, wherein the plurality of groups are formed so that areas where the change detection elements are disposed are substantially uniform.

16. The solid-state imaging device for high-speed photography according to claim 1,
wherein the imaging element area and the change detection element are separated from each other, and
the solid-state imaging device further comprises an optical system that splits light incident on the imaging element area and lets a part of the split light be incident on the change detection element.

17. The solid-state imaging device for high-speed photography according to claim 16, wherein the optical system is adjusted so that an amount of light incident on the imaging element area is larger than an amount of the light incident on the change detection element.

18. A solid-state imaging device for high-speed photography, comprising an imaging element area in which a plurality of pixel portions having photodetectors for photography are disposed in a matrix form, the solid-state imaging device generating image data by capturing pixel information obtained from the photodetectors for photography,
wherein the solid-state imaging device further comprises:
a plurality of change detection elements that detect a change in an amount of incident light, the change detection elements being disposed outside and along a periphery of the imaging element area: and
a controller that controls starting or stopping of capturing of pixel information obtained from the photodetectors for photography in accordance with a trigger signal based on a detection signal output from the change detection element, and
wherein the change detection element comprises a photodetector for change detection, a storage portion for storing a signal from the photodetector for change detection and a signal processor, and
the signal processor determines a difference between a level of a previous signal read from the storage portion and a level of a signal newly obtained from the photodetector for change detection, compares the difference with a threshold and outputs a result of the comparison as a detection signal.

19. A solid-state imaging device for high-speed photography, comprising an imaging element area in which a plurality of pixel portions having photodetectors for photography are disposed in a matrix form, the solid-state imaging device generating image data by capturing pixel information obtained from the photodetectors for photography,
wherein the solid-state imaging device further comprises:
a change detection element that detects a change in an amount of incident light, the change detection element being disposed in the imaging element area, at a predetermined position surrounding the imaging element area, or at a position related to the imaging element area while separated therefrom; and a controller that controls starting or stopping of capturing of pixel information obtained from the photodetectors for photography in accordance with a trigger signal based on a detection signal output from the change detection element, and wherein the change detection element comprises a photodetector for change detection, a storage portion for storing a signal from the photodetector for change detection and a signal processor, and the signal processor compares a level of a previous signal read from the storage portion with a level of a signal newly obtained from the photodetector for change detection and outputs a result of the comparison as a detection signal.

20. The solid-state imaging device for high-speed photography according to claim 19, wherein a plurality of storage elements are connected with a plurality of the photodetectors for photography, respectively, pixel information obtained from the photodetectors for photography is stored successively in the storage elements in accordance with the trigger signal, and after a predetermined number of pieces of pixel information are stored, information stored in the storage elements is output.

21. The solid-state imaging device for high-speed photography according to claim 19, wherein a plurality of the change detection elements are disposed inside a periphery of the imaging element area.

22. The solid-state imaging device for high-speed photography according to claim 19, wherein a plurality of the change detection elements are disposed in a cross shape extending from a center portion of the imaging element area to respective sides thereof.

23. The solid-state imaging device for high-speed photography according to claim 19, wherein a plurality of the change detection elements are disposed to gather at a center portion of the imaging element area.

24. The solid-stage imaging device for high-speed photography according to claim 19, wherein a plurality of the change detection elements are dispersed over the whole imaging element area.

* * * * *